(12) United States Patent
Hornback et al.

(10) Patent No.: US 7,740,756 B2
(45) Date of Patent: Jun. 22, 2010

(54) WASTEWATER FILTER SYSTEM

(75) Inventors: Michael J. Hornback, Shepherdsville, KY (US); Theophilus B. Terry, III, Somerville, TN (US); Jerome A. Mehling, Floyd Knobs, IN (US)

(73) Assignee: Peter W. Gavin, Durham, CT (US)

( * ) Notice: Subject to any disclaimer, the term of this patent is extended or adjusted under 35 U.S.C. 154(b) by 413 days.

(21) Appl. No.: 11/542,887

(22) Filed: Oct. 4, 2006

(65) Prior Publication Data

US 2007/0084781 A1    Apr. 19, 2007

Related U.S. Application Data

(60) Provisional application No. 60/723,645, filed on Oct. 4, 2005.

(51) Int. Cl.
*B01D 35/16* (2006.01)
*B01D 35/28* (2006.01)
*C02F 1/00* (2006.01)

(52) U.S. Cl. .............................. 210/170.08; 210/323.1; 210/335; 210/488; 210/489

(58) Field of Classification Search ................. None
See application file for complete search history.

(56) References Cited

U.S. PATENT DOCUMENTS

| | | | |
|---|---|---|---|
| 3,332,552 A | 7/1967 | Zabel | |
| 3,515,280 A | 6/1970 | Parker | |
| 3,951,818 A | 4/1976 | Bosnjak | |
| 4,402,829 A | 9/1983 | Cordua | |
| 4,448,689 A | 5/1984 | von Nordenskjold | |
| 4,707,259 A | 11/1987 | Doucet | |
| 4,710,295 A * | 12/1987 | Zabel | 210/336 |
| 5,382,357 A | 1/1995 | Nurse | |
| 5,482,621 A | 1/1996 | Nurse | |
| 5,580,453 A | 12/1996 | Nurse, Jr. | |
| 5,582,716 A | 12/1996 | Nurse, Jr. | |

(Continued)

FOREIGN PATENT DOCUMENTS

FR    2862632 A1    5/2005

OTHER PUBLICATIONS

Premier Tech Environment, Onsite Wastewater Treatment Solutions, Sep. 6, 2005, http://www.premiertech.com/pt/eng/index.htm.

(Continued)

*Primary Examiner*—Krishnan S Menon
*Assistant Examiner*—Benjamin Kurtz
(74) *Attorney, Agent, or Firm*—Wiggin and Dana LLP

(57) ABSTRACT

A filter unit for use in a casing disposed in a septic tank comprising a plurality of stacked filter plates. The individual filter plate is preferably substantially "D" shaped in circumference and has a substantially cone-shaped floor, tapering upward. The filter plates are preferably stacked in a superposed, spaced-apart manner with a particular diameter in relationship to the inner diameter of the case. The filter plates are preferably inserted into the filter case to define a seal horizontally around the bottom opening in the case, thereby allowing wastewater to enter into the filter plates to begin the filtering process. Solids preferably flow upward into the filter plates, where they are separated by size with a predetermined gap in the stacked filter plates.

21 Claims, 9 Drawing Sheets

U.S. PATENT DOCUMENTS

| | | | |
|---|---|---|---|
| 5,593,584 | A | 1/1997 | Nurse, Jr. |
| 5,618,414 | A | 4/1997 | Goupil et al. |
| 5,635,064 | A | 6/1997 | Bovington |
| 5,680,989 | A | 10/1997 | Plachy et al. |
| 5,683,577 | A | 11/1997 | Nurse, Jr. |
| 6,129,837 | A | 10/2000 | Nurse, Jr. |
| 6,360,898 | B1 | 3/2002 | Nurse, Jr. et al. |
| 6,416,664 | B1 | 7/2002 | Bovington |
| 6,478,957 | B1 | 11/2002 | Terry, III et al. |
| 6,551,508 | B1 | 4/2003 | Bovington |
| 6,602,407 | B2 | 8/2003 | Talbot et al. |
| 6,699,387 | B2 | 3/2004 | Bovington |
| 6,841,066 | B2 | 1/2005 | Nurse, Jr. et al. |
| 6,843,376 | B2 | 1/2005 | Dube et al. |
| 6,890,433 | B2 | 5/2005 | Nurse, Jr. et al. |
| 6,942,796 | B2 | 9/2005 | Lacasse et al. |
| 2001/0023845 | A1* | 9/2001 | Lacasse et al. ............... 210/435 |
| 2003/0052057 | A1 | 3/2003 | Terry, III et al. |
| 2003/0145527 | A1 | 8/2003 | Meyers |
| 2003/0209478 | A1* | 11/2003 | Nurse, Jr. et al. ............ 210/256 |

OTHER PUBLICATIONS

Eco Process, Wastewater Screening Equipment, Sep. 6, 2005, pp. 1-2, http://www.sequencertech.com/equipment/screening_equip.html.

* cited by examiner

WASTEWATER FILTER SYSTEM

CROSS-REFERENCE TO RELATED APPLICATION

This application claims priority under 35 USC §119(e) to U.S. Provisional patent application Ser. No. 60/723,645, entitled: WASTEWATER TREATMENT SYSTEM EFFLUENT FILTER, filed Oct. 4, 2005, the entire content of which is incorporated herein.

FIELD OF THE INVENTION

The present invention is directed to filter devices for filtering liquids containing particulate matters such as wastewater. More specifically, the present invention is directed to a self-contained filter unit for use in a filter housing adapted to be mounted at the outlet of a septic tank or similar device.

DESCRIPTION OF PRIOR ART

A septic tank is the first component in a private wastewater system. It is typically a large, underground, watertight container that typically ranges in size from 1,000- to 1,500-gallon capacity. In addition to the overall physical size, tanks also vary according to the internal configuration based upon whether the tank is a single or double compartment container. The number of bedrooms in a house usually determines the actual size of the septic tank.

Raw water flows from the kitchen, bathrooms and laundry room into the tank, where the solids are separated from the liquid. The heavier solids settle to the bottom of the tank, where bacteria gradually decompose them. However, some of the solids will remain, forming a sludge layer that will eventually have to be pumped out.

The lighter solids, such as fats, oils and greases, will flow to the top and gradually thicken forming a scum layer. This scum layer will also eventually have to be pumped out. The liquid waste, which is in between the scum layer and the sludge layer, typically goes to the drain field.

The last component in the system is the drain field. The soil below the drain field is the final disposal area for the liquid waste, commonly referred to as effluent. The drain field will last indefinitely unless it is forced to handle large particles, which will cause it to clog. Once the system becomes clogged, effluent will either rise to the surface above the drain field or back up into the home.

An effluent filter protects the drain field by keeping large particles in the tank while allowing the effluent to flow to the drain field. The drain field is the most expensive part of the septic system, costing thousands of dollars to repair or replace.

A typical septic tank comprises three layers: 1) a solids layer at the bottom of the tank; 2) a scum layer comprising oils, lipids and other dispersed particles at the top of the tank; and 3) a clear zone in between these layers. Typically, the filter unit is positioned in the clear zone of the tank. As wastewater enters the tank, a large amount of sediment is pulled from the water to the bottom of the tank through gravitational forces. The remaining wastewater enters into the bottom of the filter, where it is filtered to remove sediment of varying sizes. The wastewater then exits the tank and enters the drain field. Several factors determine how often a filter will require maintenance. Two primary factors are the number of people living in the house and the amount of water used. In addition, personal needs and individual habits can inhibit the normal function of a septic tank. Garbage disposals, anti-bacterial soaps and detergents, pharmaceutical medicines and disposing unwanted material into the tank can all place additional stress on the filter.

Therefore, it is important to select a filter that requires minimum maintenance without clogging, plugging or requiring constant cleaning.

The prior art is replete with filters designed to resolve the problems described above. U.S. Pat. No. 3,951,818 to Bosnjak describes a filter unit for use in a housing, where the filter unit comprises inclined lamellar structures that are superposed and spaced apart. U.S. Pat. No. 4,402,829 to Cordua describes a filter unit for use in a filter housing comprising superposed and spaced-apart inclined lamellar structures. U.S. Pat. No. 4,707,259 to Doucet describes a filter unit for use in a filter housing comprising superposed and spaced-apart inclined lamellar structures. U.S. Pat. No. 4,448,689 to von Nordenskjold describes a filtration apparatus comprising two series of filter plates separated by a central intake channel. The filter plates are superposed and spaced apart, inclined plates. U.S. Pat. No. 3,515,280 to Parker describes a filter apparatus comprising at least two stacks of spaced-apart, superposed lamellar structures. Each plate appears to be angled upwardly.

U.S. Pat. No. 4,710,295 to Zabel describes a prefilter including a plurality of stacked, horizontally-extending, disc-dam units vertically mounted in a housing. Each disc is equipped with finger-shaped appendices defined by a continuous dam-wall that follows a sinuous path. A drawback with this prefilter is that with time, the accumulation of fine particles and the formation of a biological film between the horizontal discs create hydraulic restrictions that favor a detachment of the accumulated matters toward the effluent of the septic tank and ultimately forces cleaning.

U.S. Pat. No. 6,942,796 to Lacasse et al. describes a filter device for filtering liquids containing particulate matter, specifically wastewater, and specifically for use in a septic tank. The filter comprises a series of superposed inclined discs having an inclined surface.

However, none of the prior art adequately resolves the problems described above. For instance, a key element to the success of any effluent filter is in the effluent flow pattern for particles that enter the filter unit. A particle small enough to pass through the filter barrier, also called a "weir," of the filter may be trapped inside the filter until the filter is extracted to be cleaned. Thus, a need exists for an improved effluent filter that addresses these problems. In addition, none of the prior art discloses a filter unit with a series of spaced-apart, superposed, inclined plates having a smooth upper surface, with a serpentine filtration element on the underside of each plate.

SUMMARY OF THE INVENTION

The present invention is directed to a wastewater filter comprising a plurality of stackable filter units. Each of the filter units has a first planar surface and a second planar surface. The second planar surface has a filtering wall extending therefrom to an edge, wherein the second planar surface is designed for stacking alignment with the first planar surface of an adjacent filter unit and wherein the edge forms a filter aperture with the first planar surface of the adjacent filter unit.

The present invention is further directed to a wastewater filter system comprising a plurality of stackable filter units having a first end and a second end. Each of the filter units includes a first planar surface wherein the first planar surface comprises a smooth inclined surface and a second planar surface having a filtering wall extending therefrom to an edge, wherein the second planar surface is designed for stacking alignment with the first planar surface of a second filter unit and wherein the edge forms a filter aperture with the first planar surface of the second filter unit. The filter system further includes at least one channel opening for receiving unfiltered wastewater effluent, at least one channel opening for receiving filtered wastewater effluent, connecting elements to releasibly connect the stackable filter units together, and at least one channel opening for receiving a handle unit. The first planar surface is preferably conically shaped with an inclined surface wherein the angle of inclination is less the ninety degrees. The filtering wall is a generally serpentine wall extending substantially outwardly from the second planar surface of the filter unit. The filter system preferably includes a series of channel openings for receiving unfiltered wastewater effluent. The filter system also preferably includes a sealing filter at the first end of the filter units. The sealing filter unit is designed for stacking alignment with the first planar surface of an adjacent filter unit and includes a seal for the filtered wastewater effluent channel opening.

The filter system includes a case for containing the stackable filter units. The case includes a first end which includes a funnel-shaped collar, a second, opposing end which includes an opening to allow wastewater access to the plurality of filter units, a collar adapted to form a sealing engagement with the plurality of filter units, and an outlet for the elimination of filtered wastewater.

The filter plates are preferably connected in a series of plates in a spaced-apart, superposed manner to form a cartridge of filter plates. Each plate preferably has a smooth top surface and an opposing, bottom surface comprising a series of sinuous filtering weir walls for filtration. Thus, as wastewater enters the cartridge, the filtering weir walls collect all sediment over a certain size and force it back down, either via the smooth top surface of the adjacent plate, or directly back into the tank, yielding a virtually self-cleaning filter cartridge. The term "virtually self-cleaning" connotes a filter requiring far less maintenance than that disclosed in the prior art.

The filter plates are preferably connected by at least two diametrically opposed support rods. In a preferred version, the rods are connected by a handle. The rods and handle can be of any size suitable for the user's needs, but in a preferred version, each rod and handle is 0.75 inches (1.91 cm) wide.

The filter unit of the present invention provides many advantages over the prior art. For instance, the case of the present invention is stronger and easier to level in the tank. Further, the case provides improved access to wastewater. The filter plates are virtually self-cleaning, easy to remove from the case for cleaning, easy to re-insert into the case after cleaning and provide an increased amount of surface area for filtration. Further still, the filter plates provide an improved effluent flow pattern. For instance, the prior art filter units trap effluent particles in the filter. In contrast, the present invention provides traps particles and sediments in the filtering weir walls on the bottom side of each plate. This advantageously leaves the top surface of each filter plate smooth and unencumbered, thereby allowing any particulate matter trapped by the filter unit to smoothly slide down the inclined, unencumbered top surface of each plate, out of the filtration unit, and into the bottom of the septic tank.

In addition, unlike the prior art, the filter unit of the present invention does not include a hollow discharge chamber. Rather, each filter plate preferably comprises a series of openings which simultaneously allow the clean, filtered fluid to continue rising up and eventually out of the filter unit and particulate matter removed from the fluid to drop back down to the tank.

DETAILED DESCRIPTION OF THE INVENTION

Figure 1:
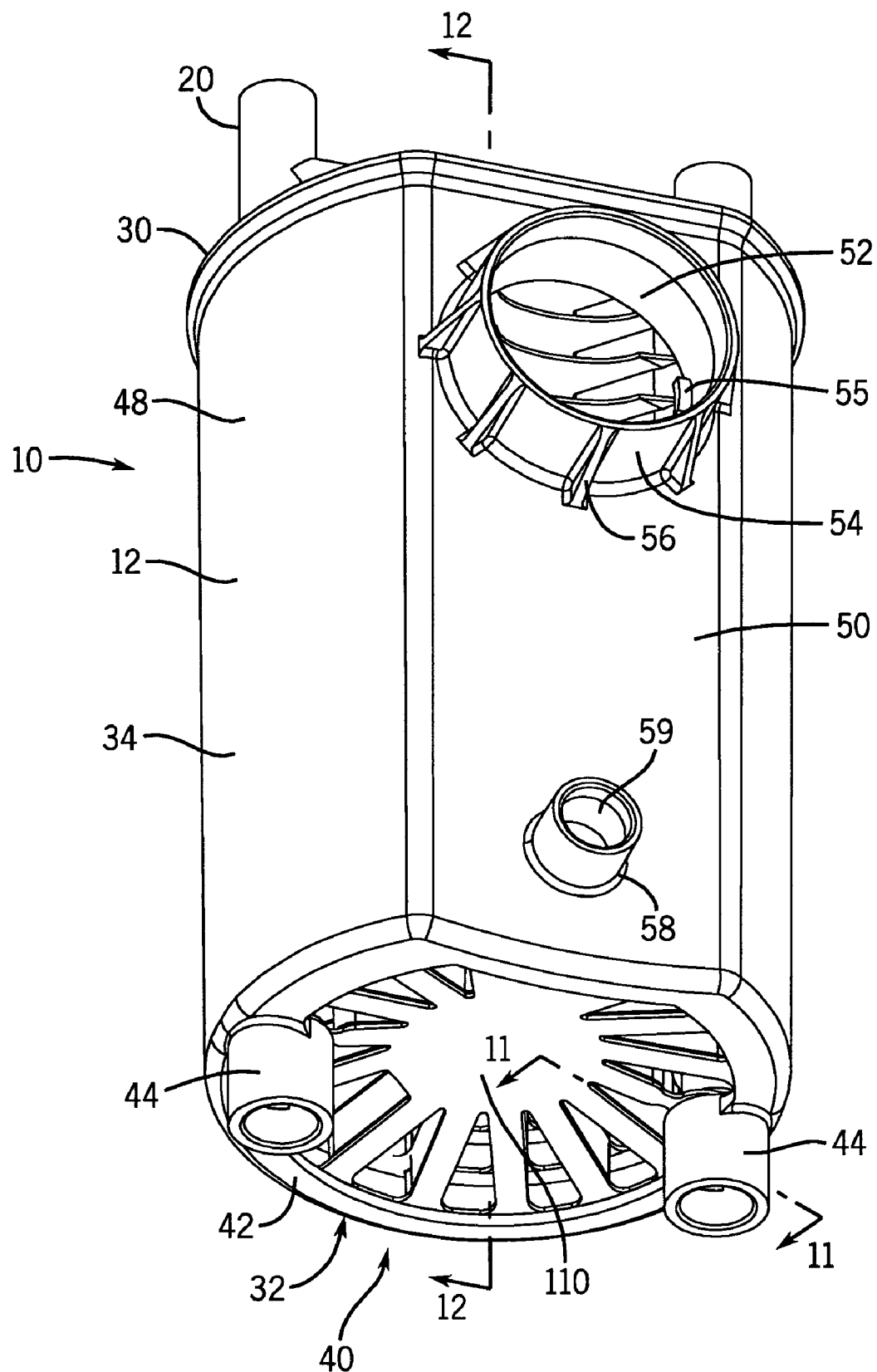
FIG. 1 is a perspective view of the filter system of the present invention.
Figure 2:
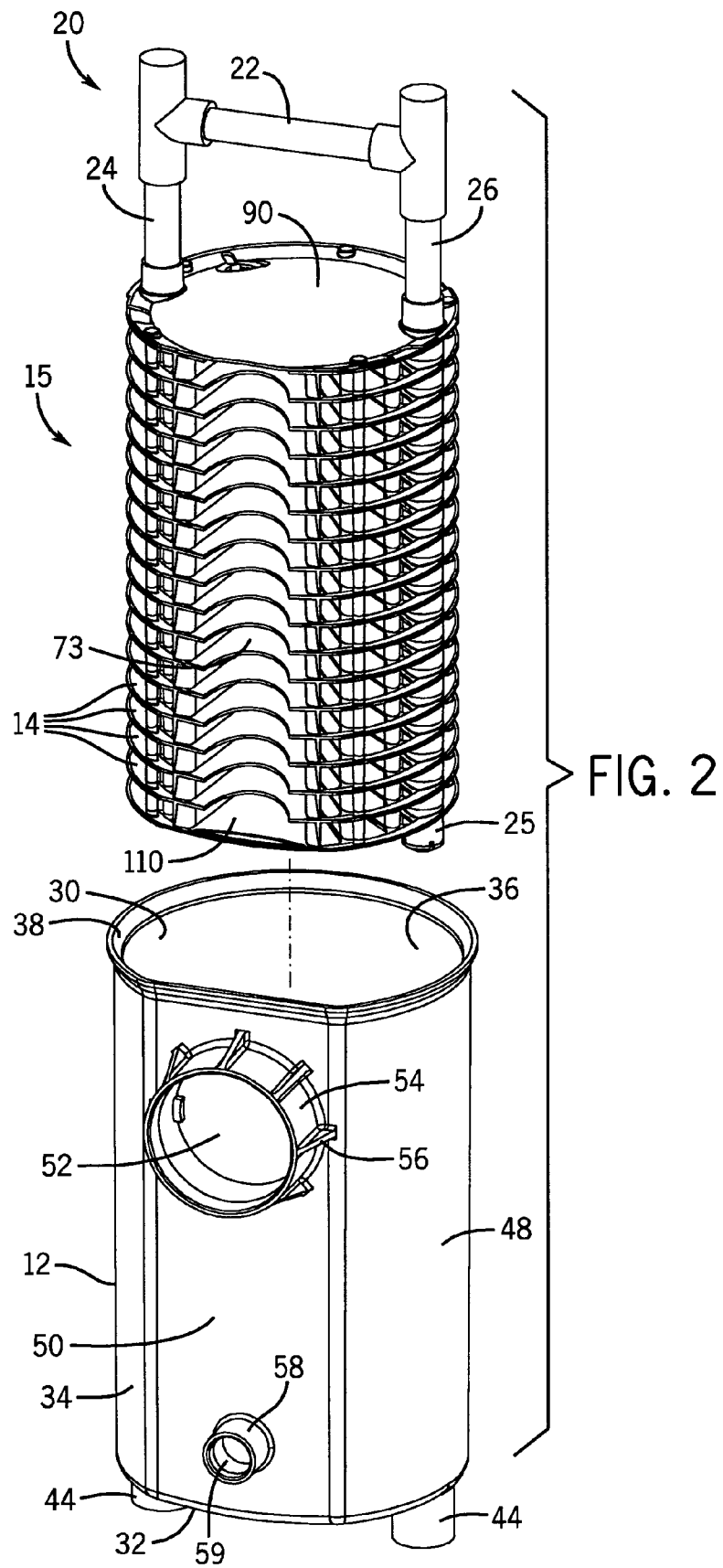
FIG. 2 is an exploded view of the cartridge portion of the filter unit removed from the filter case.

Referring to FIGS. 1 and 2, a new and improved effluent filter 10 for use in septic systems is shown. The filter 10 of the present invention preferably comprises a case 12 surrounding at least two and typically a plurality of substantially cone-shaped filter plates 14 combined in a superposed, spaced-apart manner to define a cartridge 15 of filter plates 14.

The filter plates 14 are preferably connected via a handle unit 20. The handle unit 20 includes a generally horizontal hand grip 22 perpendicularly supported by two elongated rods 24 and 26 which extend from an area above the cartridge 15 through each filter plate 14 in a manner which will be described further in this disclosure. Situated at the proximal end of the elongated rods 24 and 26 are matching end caps 25 which assist in the placement and securing of the cartridge 15 in the case 12 as will be described later in the disclosure.

Figure 3:
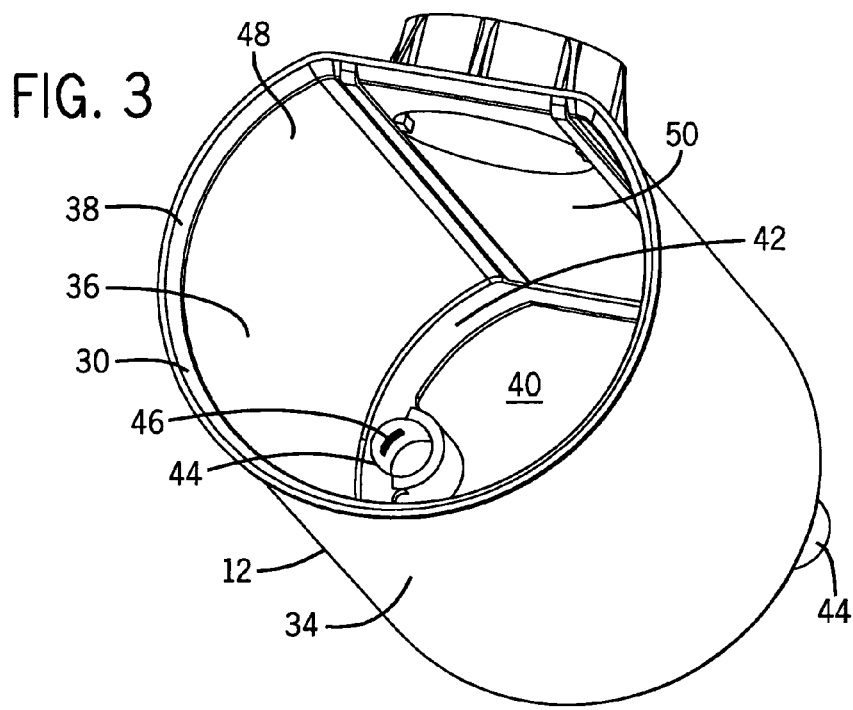
FIG. 3 is a perspective view of the filter case viewed from the top side.

The Case:

Referring now to FIGS. 1, 2 and 3, the case 12 preferably comprises a substantially hollow, cylindrical structure having an open first top end 30, a second, opposing, bottom end 32, a first outer surface 34 and a second inner surface 36. The case 12 is preferably open at both ends 30 and 32.

Preferably, the case 12 is conically-shaped to facilitate the placement of the cartridge 15 in the case 12. As illustrated in FIG. 1, the first end 30 of the case 12 is defined by a funnel-shaped collar 38 to catch and assist in the initial placement of the cartridge 15 as the cartridge 15 is lowered into the case 12. The case 12 also tapers slightly from the first end 30 to the second end 32. For example, the diameter of the case 12 at the second end 32 may be slightly less, e.g., 0.25 inches (0.66 cm) less, than the diameter of the first end 30. The angular reduction facilitates the placement and removal of the cartridge 15. While it is within the scope of the present invention to provide a case 12 with straight, i.e., non-tapered walls, the preferred mode is to include a slight tapering as described above.

As illustrated in FIGS. 1 and 3, end 32 is defined by an opening 40 to allow sewage effluent better access to the cartridge 15 and to provide more tolerance for turbulence, preventing any "surges" of effluent from moving the cartridge 15 of filter plates 14 within the case 12.

The second end 32 of the case 12 is also defined by a collar 42 which surrounds the opening 40 as illustrated in FIGS. 1 and 3. The collar 42 also forms a sealing engagement with the cartridge 15 when the cartridge 15 is in place in the case 12 as will be described later. As illustrated in FIGS. 1 and 3, the collar 42 also includes two integrally molded hubs 44 for attaching the cartridge 15 to the case 12. The hubs 44 are preferably diametrically opposed in the collar 42 along the circumference of the case 12. The hubs 44 are designed to frictionally engage the end caps 25 of the handle unit 20 in order to releasibly fasten the cartridge 15 to the case 12. To that end, the hub 44 includes at least one and preferably a series of extended ridges 46 for assistance in releasibly securing the cartridge 15 to the case 12. The hubs 44 can be of any size, but in a preferred version, accommodate the end caps 25 of the rods 24 and 26.

As illustrated in FIGS. 1, 2 and 3, the case 12 has a generally D-shaped configuration, including a rounded portion 48 and a flat wall 50. The flat wall 50 is defined by an outlet 52, an opening in the flat wall 50 of the case 12. The outlet 52 is defined by an outlet collar 54 molded to the case 12. One or more strengthening grids 56 may also be formed on the outlet collar 54 to strengthen the placement of the outlet collar 54 to the flat wall 50 of the case 12.

The case 12 may also include a supporting hub 58 located on the flat wall 50 of the case 12 and below the outlet 52. The purpose of the supporting hub 58 is to align and support the filter unit 10 in the septic tank to maintain the filter 10 in a generally vertical position and to prevent undue angular pressure on the outlet collar 54, which may cause breakage at the area of the outlet collar 54. In operation, a spacer rod (not shown) is designed to fit within the opening 59 of the supporting hub 58. The spacer rod is generally long enough to extend to the inside wall of the septic tank to support the filter 10 in vertical alignment.

Preferred materials for the case 12 are any durable material, such as plastic or metal. In a preferred version, the case is made from plastic, PVC or any suitable thermoplastic material known to the art.

Referring now specifically to FIGS. 2 and 4-9, the filter plates 14 of the present invention are shown. In a preferred version, each filter plate 14 comprises an angled, smooth top surface 60 surrounded by a circumferential ring or collar 62; a bottom surface 64 comprising a serpentine series of filtering weir walls or dams 66 protruding substantially outwardly from the bottom surface 64 and ending at dams 68.

The filter plates 14 are characterized by a series of triangular openings 70 arranged around the substantially circular circumference of each plate 14. As illustrated in the drawings, the triangular openings 70 border the collar 62. However, it is within the scope of the present to place the openings 70 in other locations on the surface 60 of the filter plate 14. In addition, it is within the scope of the present invention a variety of shapes other than a triangle as long is the openings 70 of the stacked filter plates 14 align to form one or more primary wastewater effluent channels 71 as will be described later in this disclosure.

The filter plates 14 are also characterized by at least one substantially U-shaped groove 72 on one edge of the plate 14 and cut into the collar 62 of the filter plate 14. While the groove 72 is illustrated as having a U or scalloped shape, it is within the scope of the present invention for the groove any defined shape as long as it provides open space to form a filtered effluent channel 73 as will be described later in the disclosure.

The filter plates 14 are also optionally but preferably provided with a substantially V-shaped groove 74 positioned generally diametrically opposite the U-shaped groove 72 and also cut into the collar 62. While the groove 74 is illustrated as having a V shape, it is within the scope of the present invention for the groove any defined shape as long as it provides open space to form an optional secondary wastewater effluent channel 75 as will be described later in the disclosure.

At least two circular rod channels 76 are positioned on diametrically opposing sides of each plate 14 for receiving rods 24 and 26 of the handle unit 20. In addition, the filter plate 14 includes a plurality of connecting pins 78, including a male end 80 and a female end 82. The connecting pins 78 are used to connect the filter plates 14 together in a superposed, spaced-apart manner to define the cartridge 15 as illustrated in FIG. 2.

Figure 4:
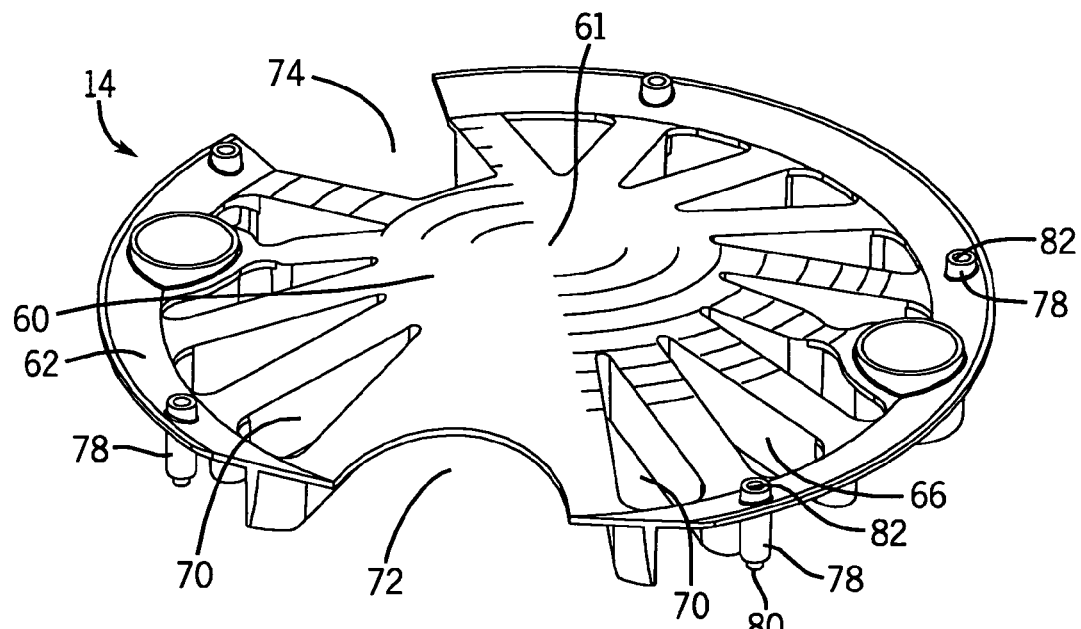
FIG. 4 is a top perspective view of a filter plate of the present invention.
Figure 5:
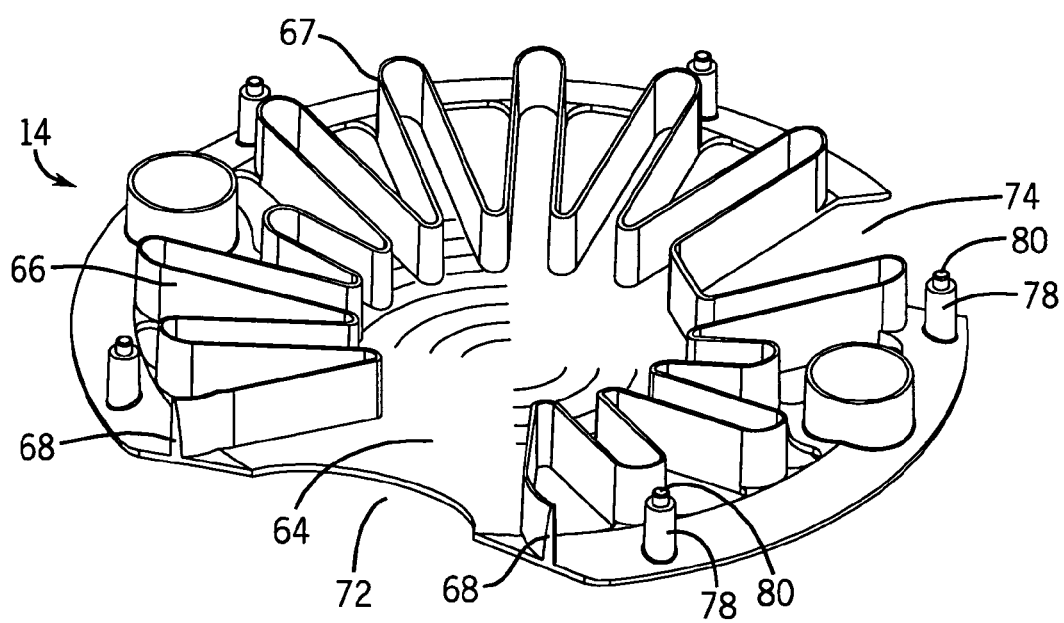
FIG. 5 is a bottom perspective view of the filter plate of FIG. 4.

Referring to FIGS. 4 and 5, the dorsal and ventral views of an individual filter plate 14 are illustrated. In a preferred version, the top surface 60 is generally smooth While the surface of the filter plate may be flat, the preferred filter plate 14 angles upwardly in an inclined direction at an approximate angle up to but not including ninety degrees, preferably an angle between ten and forty degrees, and most preferably between twenty and thirty degrees toward the center 61 of the top surface 60 of the filter plate 14. However, in alternate versions, this angle may change. Further, while in a preferred version the angle of each plate 14 is identical, in alternate versions, the angles of each filter plate 14 may vary from each other.

The bottom side 64 of each plate 14 preferably comprises at least one weir wall 66 in contact with the inclined bottom surface 64 of the filter plate 14. The weir wall is defined by an edge 67. The weir wall 66 preferably comprises a thin, sinuous or serpentine wall that extends substantially outwardly from the bottom surface 64 of the plate 14. The weir wall 66 provides a large surface area to further assist in the collection and removal of sediment from the filter unit 10.

Figure 6:
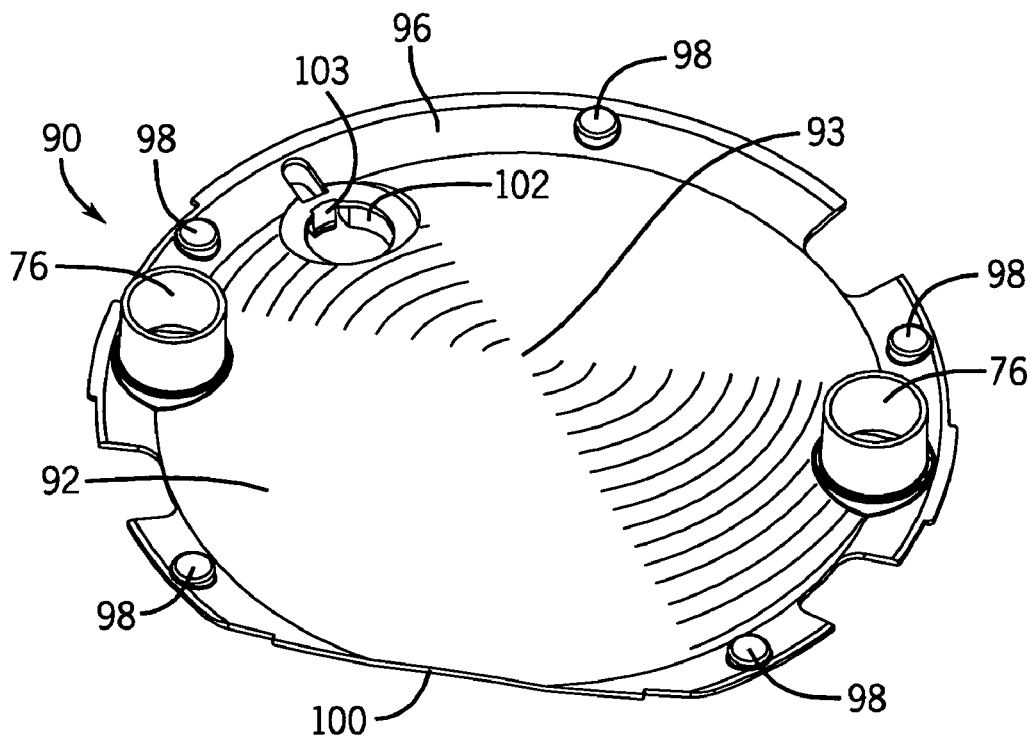
FIG. 6 is a top perspective view of the first or top filter plate of the present invention.
Figure 7:
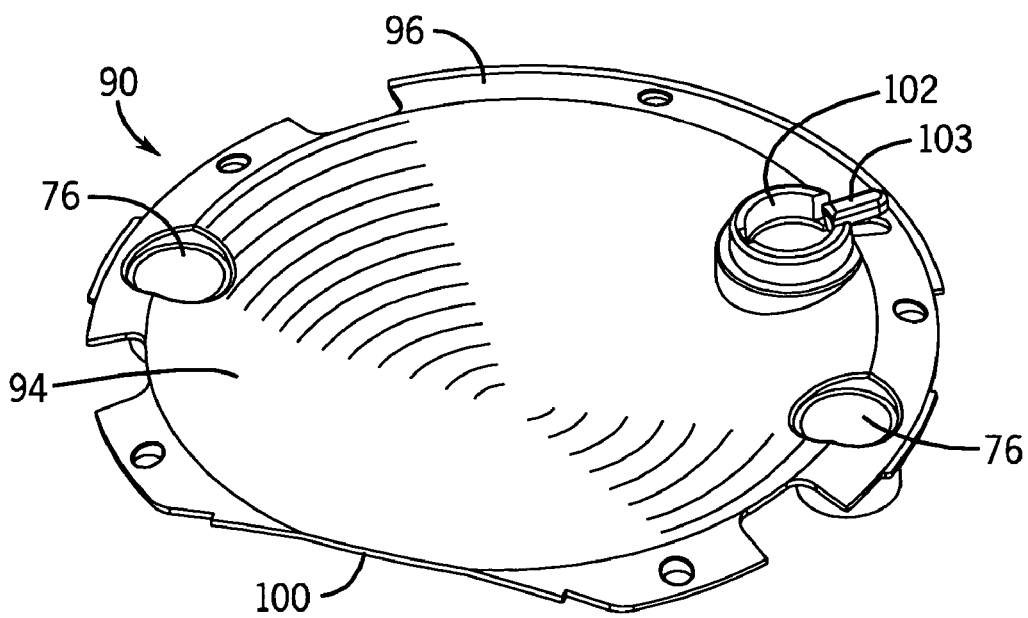
FIG. 7 is a bottom perspective view of the filter plate of FIG. 6.

Reference is now made to FIGS. 2, 6 and 7, which illustrate the uppermost seal plate 90, which has a similar design as the filter plates 14. However, there are distinctions between the seal plate 90 and the filter plates 14 as the seal plate 90 is designed to act as an upper seal to the cartridge 15 when the cartridge 15 is placed in the case 12. Like filter plate 14, the seal plate 90 has a generally circular configuration with a top surface 92, a bottom surface 94 and a collar 96. The top surface 92 of the seal plate 90 is preferably angled at an upward slope to the center 93 of the top surface 92. Additionally, circular channels 76 are provided for the rods 24 and 26 of the handle unit 20. Because connecting pins 78 are not necessary to apply to the seal plate 90, as there are no plates above seal plate 90, the collar 96 includes tabs 98 to receive the male end 80 of the connecting pins 78 from the adjacent filter plate 14. Unlike filter plate 14, the seal plate 90 is not equipped with a U-shaped groove 72. Rather, seal plate 90 includes a squared edge 100 designed to align with the collar 38 at the area of the flat wall 50 in the case 12 to provide a seal at the upper end of the U-shaped channel 73.

An additional opening 102 with a snap tab 103 is provided in the seal plate 90. The opening 102 is situated in alignment with the secondary wastewater effluent channel 75 created by the V-shaped grooves 74 of the successive filter plates 14. The purpose of opening 102 and the secondary wastewater effluent channel 75 is to receive an optional alarm system (not shown), known to the art, within the filter unit 10. Reference is made to U.S. Pat. No. 6,841,066 to Nurse, Jr. et al., which is incorporated by reference for its disclosure of an alarm system which can be used in the present invention. The opening 102 includes the snap tab 103 and other mechanisms known to the art to allow the alarm system to be placed in locking engagement within the secondary wastewater effluent channel 75 of the filter unit.

As illustrated in FIG. 7, the bottom surface 94 of seal plate 90 is characterized by a lack of weir walls 66. Thus, the seal plate 90 rests directly on the top filter plate 14.

Figure 8:
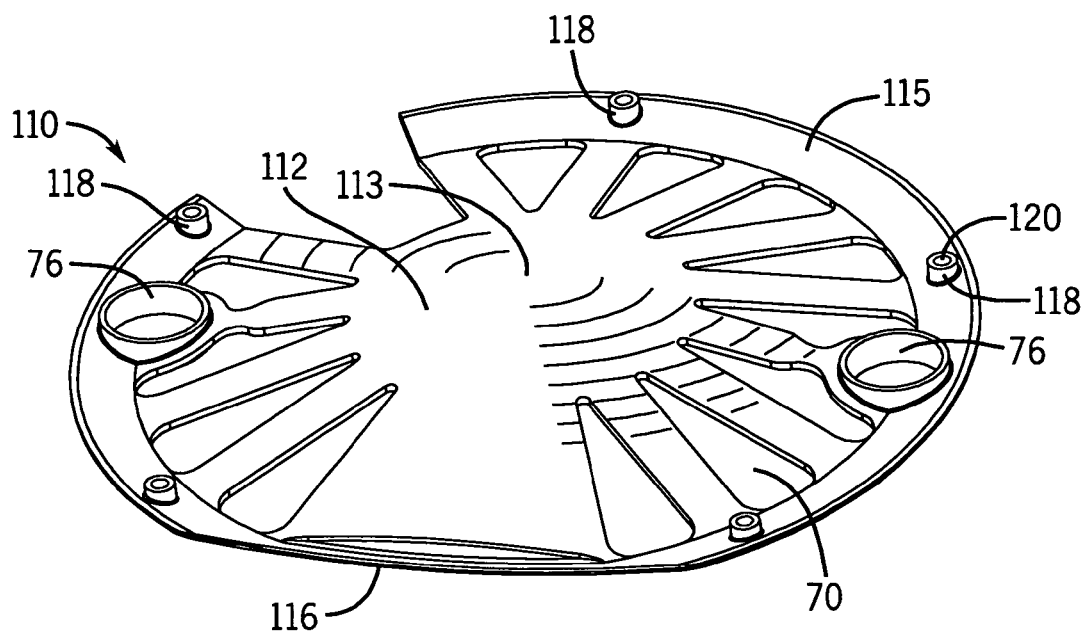
FIG. 8 is a top perspective view of the last or bottom filter plate of the present invention.
Figure 9:
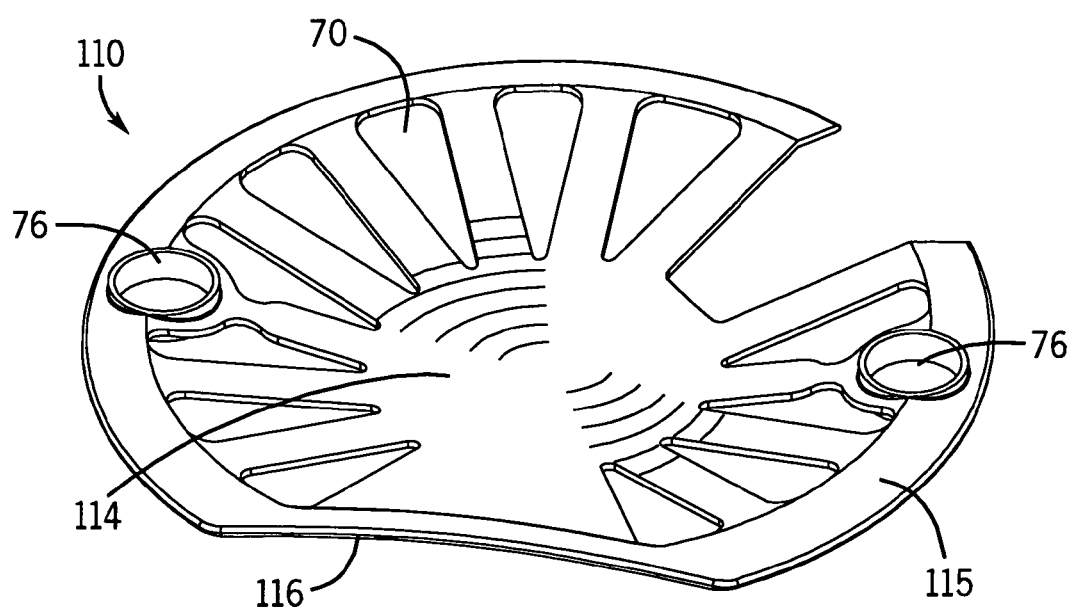
FIG. 9 is a bottom perspective view of the filter plate of FIG. 8.

Reference is now made to FIGS. 8 and 9, which illustrate the bottom filter plate 110, which is designed to be the lowest filter plate in the cartridge 15. Filter plate 110 is characterized by a top surface 112, a bottom surface 114, a collar 115, triangular openings 70, which align with the triangular openings 70 of the filter plates 14 and a V-shaped groove 74 which aligns with the V-shaped groove 74 of the filter plates 14. In addition, there are channel openings 76 for the rods 24 and 26 of the handle unit 20. Similar to the seal plate 90, but unlike filter plates 14, the collar 115 includes a flat edge 116 which serves as the lowermost seal to the channel 73 thereby preventing any of the wastewater effluent from the septic tank to go directly into the channel 73.

When the cartridge 15 is in place in the case 12, the collar 42 on the case 12 aligns with the collar 116 of the bottom filter plate 110 to form a seal on the filter unit 10 and force the wastewater effluent through the primary wastewater effluent channels 71 and secondary wastewater effluent channel 75. Thus, the bottom plate 110 creates a seal between the septic tank and the interior of the filter unit 10, closing off the filter unit 10 from the rest of the septic tank and blocking any wastewater effluent into the cartridge 15 in any other way other than the primary wastewater effluent channels 71 and the secondary wastewater effluent channel 75.

As illustrated in FIG. 9, the bottom surface 114 of the bottom filter plate 110 is smooth and does not include any weir walls 66. Like the other filter plates, the bottom filter plate 110 is preferably conically-shaped such that the upper surface 112 and bottom surface 114 are angled toward the center 113 of the top surface of filter 110. In addition, the bottom filter plate 110 is characterized by a modified connecting pin 118, which only includes a female end 120 to receive the male end 80 of the adjacent filter plate 14.

Figure 10:
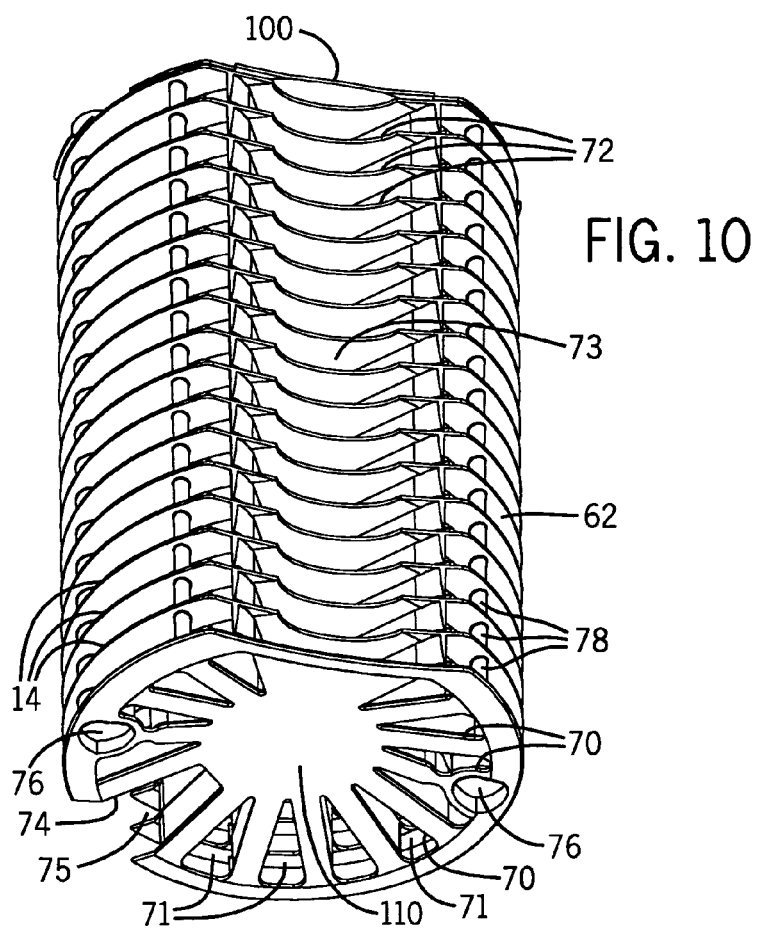
FIG. 10 is a perspective view of a carriage of filter plates.
Figure 11:
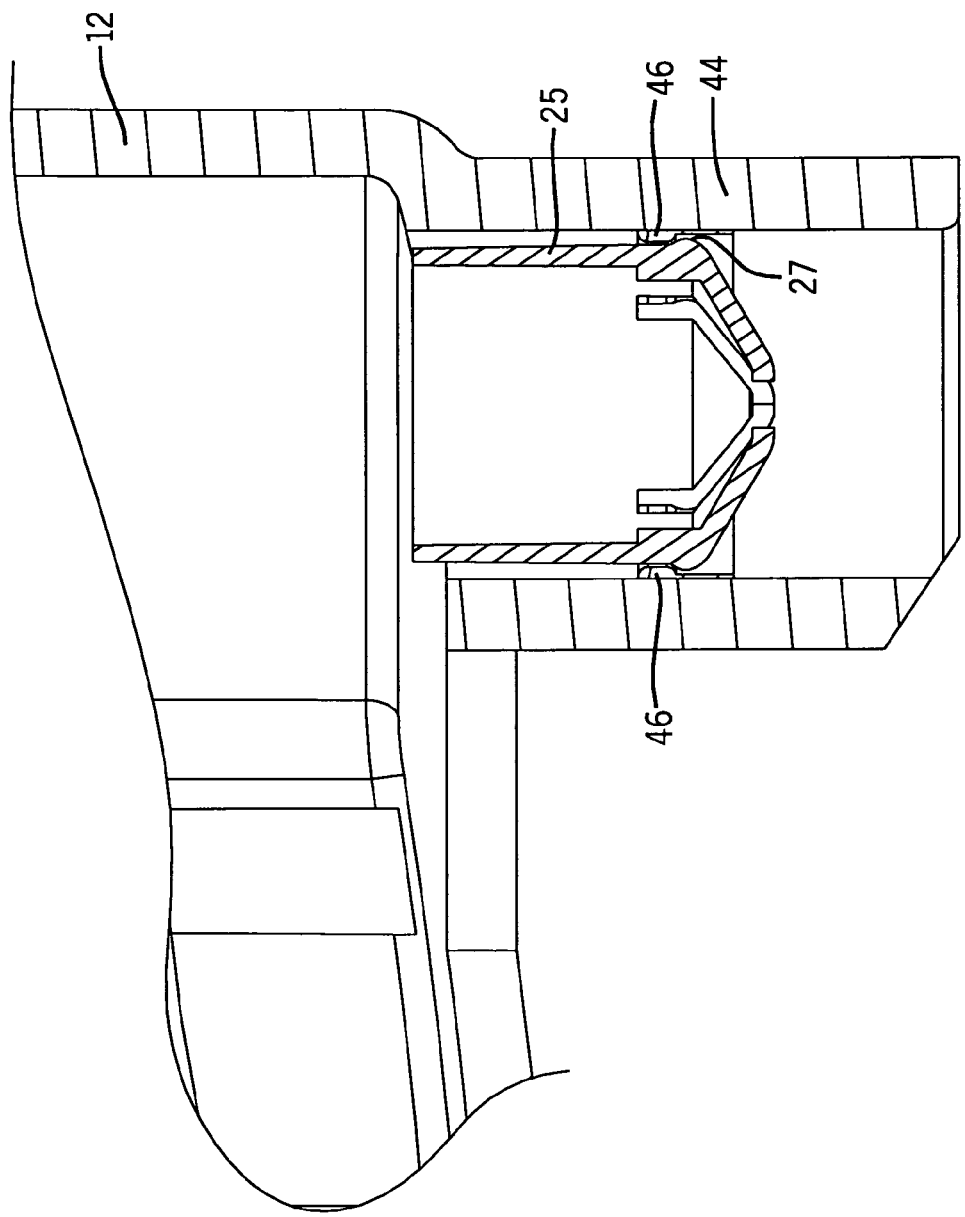
FIG. 11 is a cross-sectional view of one hub of the filter case taken along lines 11-11 of FIG. 1.

As shown in FIGS. 2, 10 and 11, filter plates 14 are stacked in an accordion-like fashion, one atop another, from the bottom filter plate 110 to the top seal plate 90 to form the cartridge 15. The number of filter plates 14 forming the cartridge 15 depends upon the needs of the filter unit 10. While a minimum of two filter plates 14 are necessary to form the cartridge 15, it is preferable to have a plurality of filter plates 14 as illustrated in the figures. The filter plates 14 are stacked and connected by the placement of female end 82 of the connecting pin 78 of one filter plate 14 on the male end 80 of a connecting pin 78 of the next filter plate 14 above it. The placement of the connecting pins 78 aligns the filter plates 14 to form the cartridge 15 as illustrated in FIG. 2.

Figure 12:
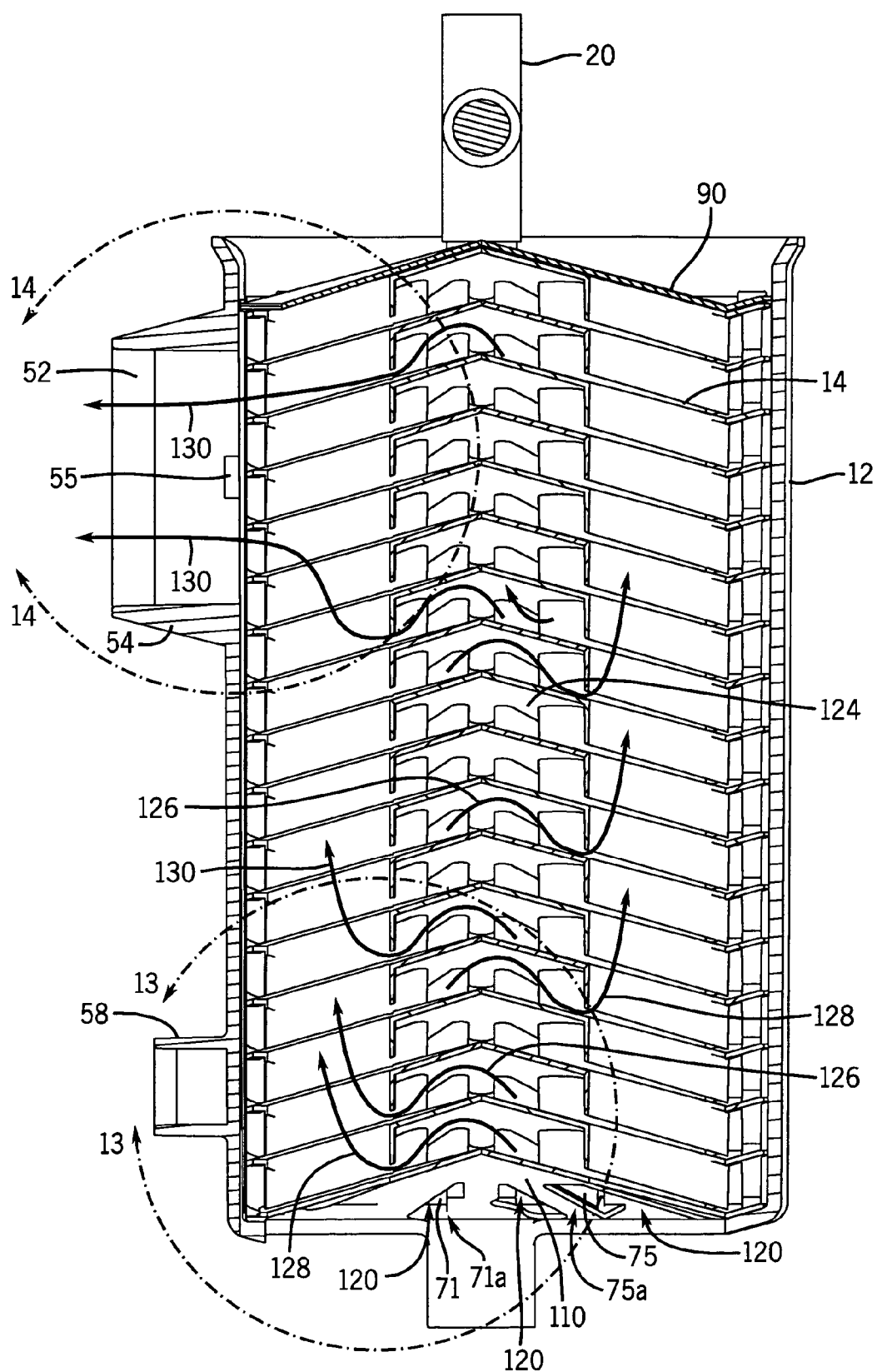
FIG. 12 is a cross-sectional view of the cartridge of the present invention taken along lines 12-12 of FIG. 1.
Figure 13:
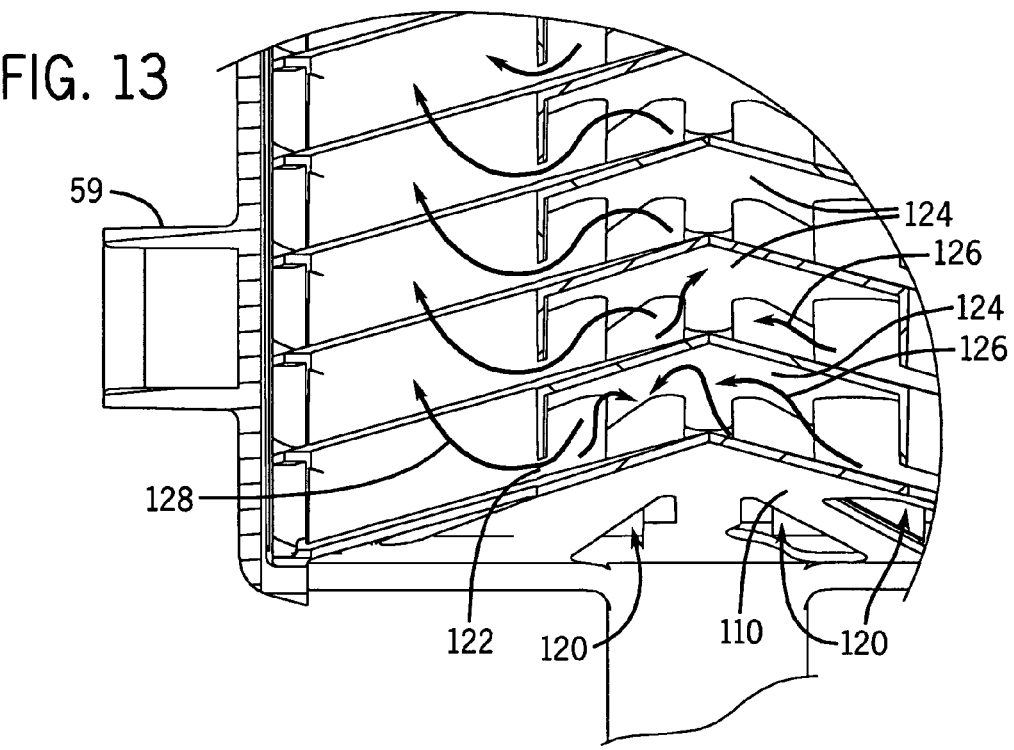
FIG. 13 is an enlarged segmental view of a portion of FIG. 12 at line 13-13.
Figure 14:
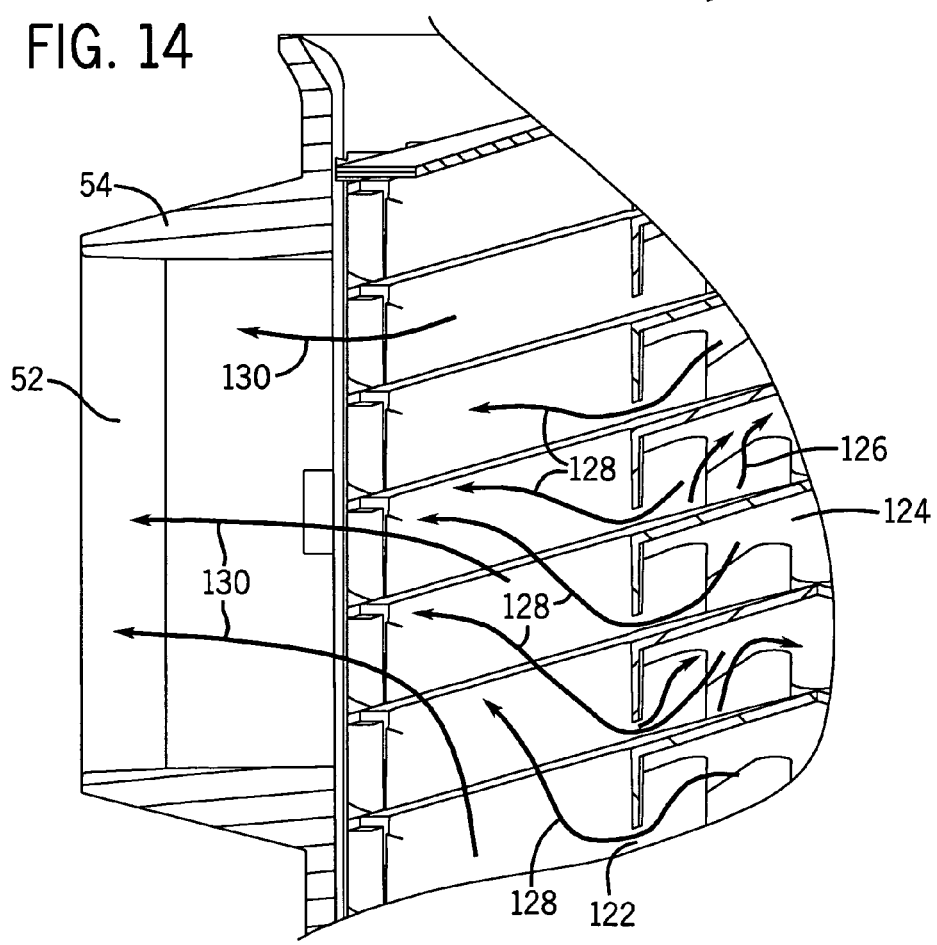
FIG. 14 is a enlarged segmental view of a portion of FIG. 12 taken at line 14-14.

As illustrated in FIGS. 12-14, the connecting pins 78 play another important role in the filtering action of the filter unit 10. The height of each connecting pin 78 determines the distance between adjacent filter plates 14. Thus, the connecting pins 78 must provide a sufficient distance between adjacent filter plates 14 such that a gap 122 is formed between the edge 67 of the filtering weir walls or dams 66 and the top surface 60 of an adjacent filter plate 14 and the top surface 112 of the bottom filter plate 110, as best illustrated in FIG. 13. The size of the gap 122 determines the size of a particulate which may eventually leave the filter unit 10 through the outlet 52. For example, the filter plates 14 may be stacked one upon each other such that the edge 67 of the weir wall 66 of one filter plate 14 forms a one-eighth inch (0.32 cm) gap 122. In this manner, all particulates or sediment in the wastewater effluent larger than one-eighth inch will be trapped by the weir wall 66, thus preventing larger sediment from flowing out of the filter unit 10. The gap 122 distance may be adjusted by the height of the connecting pins 78. It is within the scope of the present invention to adapted the connecting pin length to provide varying gap sizes from one-thirty second inch (0.08 cm) and smaller to one-eighth inch and larger.

When the filter plates 14 are stacked upon each other in alignment, the following channels are formed:
1) the alignment of the triangular openings 70 form the primary wastewater effluent channels 71 which extend from the bottom filter plate 110 in the cartridge 15 up to but not passing through the seal plate 90 in the cartridge 15;
2) the alignment of the V-shaped grooves 74 on each successive filter plate form the secondary wastewater effluent channel 75 extending from the bottom filter plate 110 to the seal plate 90;
3) the alignment of the U-shaped grooves 72 on each succeeding filter plates 14 form the U-shaped channel 73 extending from the bottom filter plate 110 to the seal plate 90; and
4) the alignment of the circular channels 76 in each filter plate 14 forms the channels for receiving the rods 24 and 26 of the handle unit 20.

As illustrated in FIGS. 2 and 11, the proximal ends of the rods 24 and 26 of the handle unit 20 are defined by identical end caps 25. Referring to FIG. 2, the elongated rods 24 and 26 pass through the openings 76 in each of the filter plates in the cartridge 15 and extend beyond the lowest filter plate. Once the rods 24 and 26 have extended through the cartridge 15, the end caps 25 are secured to the proximal ends of the rods 24 and 26 as illustrated in FIG. 2. The end caps 25 provide the joint responsibility of securing the filter plates 14 together to form the cartridge 15 and releasibly securing the cartridge 15 to the case 12.

Reference is made to FIG. 11 which shows the end cap 25 with a friction fit ridge 27 designed to frictionally engage the hubs 44 of the case 12 by snap fitting the ridge 27 of the end cap 25 over and beyond the ridge 46 of the hubs 44 to releasibly engage the cartridge 15 to the case 12. In this manner, the cartridge 15 may be connected to the case 12 without concern for the cartridge 15 dislodging from the case 12 until releasing pressure is applied to the end caps 25 of the handle unit 20. The extended ridge 46 of each hub 44 may be in the form of a continuous ring around the interior wall of the hub 44 or a series of extended ridges as illustrated in FIG. 3.

The following description of the operation of the filter unit 10 illustrates the unique three-stage filtering system provided by the filter unit 10. In use, the filter 10 is submerged and affixed in a septic tank (not shown) at a point such that at least the bottom end 32 of the filter unit 10 is positioned below the surface level of the wastewater effluent in the septic system. For purposes of the present invention, the contents of the septic system will generally be referred to as "wastewater effluent." As can be imagined, wastewater effluent is a fluid or water-based composition generally in liquid form which includes a variety of particulate material of a variety of sizes. A drain pipe (not shown) is connected to the outlet collar 54 of the outlet 52 to allow the filtered effluent exiting from the filter 10 to flow to a drain field. As illustrated in FIGS. 1 and 12, the outlet collar may be provide with one or more stops 55 to prevent the drain pipe from entering the filter unit 10 and possibly damaging the cartridge 15 or prohibiting flow to the outlet 52.

The first stage: Wastewater effluent in the septic tank containing unwanted particulate matter can only enter the filter unit 10 through the opening 40 in the case 12 and flow upwardly through the cartridge 15 in the direction of the outlet 52. Because of the configuration of the bottom filter plate 110, the wastewater effluent must flow through the primary wastewater effluent channels 71 and the secondary wastewater effluent channel 75 in the filter plates 14 and 110 along the flow path identified by lines 120 in FIGS. 12 and 13. The composition of the wastewater effluent entering the filter unit 10 is determined by the size of the entrance openings 71*a* and 75*a* of the primary wastewater effluent channels 71 and the secondary wastewater effluent channel 75. Any particulate matter having a size larger than the entrance openings 71*a* or 75*a* will not pass into the filter unit 10, which creates the first stage of the filtering system.

The second stage: As the wastewater effluent moves in an upwardly direction through the primary wastewater effluent channels 71 and the secondary wastewater effluent channel 75, the sediment in the wastewater is hindered by the filtering weir walls 66 of each filter plate 14. If the gap 122 size of the cartridge 15 is one-eighth inch, any particles in the wastewater effluent larger than one-eighth inch cannot pass through the gap 122. The larger particles therefore must remain in the primary wastewater effluent channels 71 and the secondary wastewater effluent channel 75 and eventually float by gravity pull down the primary wastewater effluent channels 71 and the secondary wastewater effluent channel 75 and out the opening 40 at the bottom end 32 of the filter unit 10. This forms the second stage of filtration provided by the filter unit 10 whereby all particulates in the wastewater effluent larger than a designated size, one-eighth inch in this example, are prevented from flowing past the primary wastewater effluent channels 71 and the secondary wastewater effluent channel 75 of the cartridge 15.

The third stage: With continued reference to FIGS. 12, 13 and 14, the wastewater effluent in the primary wastewater effluent channels 71 and the secondary wastewater effluent channel 75 continues to rise only through the primary wastewater effluent channels 71 and the secondary wastewater effluent channel 75. Only the wastewater effluent with a particulate size less than the designated gap 122 size will then be able to pass through the gap 122 and enter the chamber 124 as shown by the flow path identified by lines 126.

As the wastewater effluent enters the chamber 124, continuous pressure builds in the chamber 124 requiring the evacuation of the wastewater effluent, which follows the flow path identified by lines 128, into the filtered effluent channel 73. However, the swirling action of the wastewater effluent within the chamber 124 also causes the smaller, i.e., less than one-eighth inch, particulates to come into contact with the filtering weir walls 66, which effectively hinders the particulate motion and impedes the particulate from exiting the chamber 124 through the flow path 128. The particulates which then remain in the chamber 124 eventually fall by gravity to the top surface 60 of the adjacent filter plate 14 or the top surface 112 of the bottom filter plate 110. Because of the conical, smooth surface 60 or 112 of the filter plates 14 or 110, the particulate matter will continue a downward migration toward the direction of the collar 62 of the filter plate 14 and eventually fall into the primary wastewater effluent channels 71 and the secondary wastewater effluent channel 75 and freefall through the opening 40 and out of the filter unit 10. This forms the third stage filtration process in the filter unit 10 whereby smaller particulate matter may be removed along with the larger particles.

With each rising filter plate 14 in the cartridge 15, greater amounts of particulate matter are removed from the wastewater effluent. As the particulate matter is collected by the filtering weir walls 66, it is directed through the weir wall 66 and down the inclined top surface 60 of the adjacent filter plate 14. The sediment slides downwardly along the inclined, smooth, top surface 60 of the filter plate 14 and through the openings 70 onto the top surface 60 of the next lower filter plate 14 in the cartridge 15. When the sediment reaches the lowest filter plate 14 in the cartridge 15, the sediment exits through the opening 40 at the bottom end 30 of the case 12 and drops back into the septic tank.

As the wastewater continues rising upwardly through the filter unit 10 toward the outlet 52, each level of filter plates 14 remove additional quantities of sediment from the wastewater. In turn, the sediment which is hindered by the filtering weir walls 66 extending downwardly from the lower surface 64 of each filter plate 14 drops onto the smooth upper surface 60 of the next lower filter plate 14. The downward angle of the conical filter plate 14 creates a gravity pull on the sediment causing the sediment to roll or move toward the outer ring 62 of each filter plate 14. As the flows toward the outer ring 62, the sediment encounters the triangular openings 70 and free fall toward the opening 40 at the bottom 32 of the filter 10 to exit the filter and drop to the bottom of the septic tank.

The purpose of the filtered effluent channel 73 is to give volume to any filter effluent to enable the effluent flow up the filter unit 10 to exit through the outlet 52 as illustrated by the flow path designated by lines 130. As the filtered effluent enters the filtered effluent channel 73, the filtered effluent rises through the filtered effluent channel 73 and eventually exits through the outlet 52. Therefore, any filtered effluent and any sediment which reaches the filtered effluent channel 73 will leave the filter 10 along flow paths 128 and 130 through the outlet 52, thereby exiting completely from the septic tank.

It is within the scope of the present invention to provide slight modifications to the shape of the filter plates 14 in the cartridge 15 to enable the cartridge 15 to be used in combination with a case having a different shape and size. For example, the flat wall of the filter plates 14 could be eliminated and other arrangements made to create a filtered effluent channel in order to accommodate a round shape case. In addition, the filter plate 14 can have a squared shape. Therefore, it may not be necessary to replace the entire filter unit but simply to retrofit a cartridge 15 of filter plates 14 into the existing case. Further, all existing mound systems or other systems with no filter may be fitted with the filter plates and/or case of the present invention.

The filter plates 14 may be made of any durable material such as metal or plastic. In a preferred version, the filter plates are made from plastic.

It is understood that the invention is not confined to the particular construction and arrangement of parts herein illustrated and described, but embraces such modified forms thereof as come within the scope of the claims in any later-filed non-provisional application. Note that further exemplary preferred versions of the invention are described in the appended pages, which are incorporated by reference and constitute a portion of this application.

What is claimed is:

1. A wastewater filter comprising:
    a case including an open bottom end for receiving an inflow of sewage into said filter and an outlet positioned above said open bottom end for allowing filtered effluent to exit said filter; and
    a plurality of stackable filter units sized to fit within said casing, each of the filter units having a first planar surface and a second planar surface, the first planar surface having a closed center portion, the second planar surface having a filtering wall extending downwardly therefrom toward said open bottom end to an edge and one or more openings formed adjacent said filtering wall, said one or more openings fluidly connecting said first and second planar surfaces, wherein the second planar surface is designed for stacking alignment with the first planar surface of an adjacent filter unit and wherein the edge forms a filter aperture with the first planar surface of the adjacent filter unit, wherein the plurality of stackable filter units are vertically oriented so that for each of the filter units the first planar surface is a top surface that is closer to said outlet than said second planar surface and the second planar surface is a bottom surface that is positioned below the top surface and closer to said open bottom end than said first planar surface.

2. The filter of claim 1 wherein the first planar surface comprises a smooth inclined surface.

3. The filter of claim 1 wherein the first planar surface comprises a conical shaped with an inclined surface wherein the angle of inclination is less the ninety degrees.

4. The filter of claim 3 wherein the angle of inclination is between twenty and forty degrees.

5. The filter of claim 1 wherein the filtering wall comprises a serpentine wall extending substantially outwardly from the second planar surface of the filter unit.

6. The filter of claim 1 further comprising at least one channel opening for receiving unfiltered wastewater effluent.

7. The filter of claim 6 further comprising a plurality of channel openings.

8. The filter of claim 7 further comprising at least one channel opening for receiving filtered wastewater effluent.

9. The filter of claim 1 further comprising a channel opening for receiving a filter unit alarm.

10. The filter of claim 1 further comprising at least one channel opening for receiving a handle unit.

11. The filter of claim 1 further comprising connecting elements to releasibly connect the stackable filter units together.

12. A wastewater filter system comprising:
a. a case including an open bottom end for receiving an inflow of sewage into said filter and an outlet positioned above said open bottom end for allowing filtered effluent to exit said filter; and
b. a plurality of stackable filter units sized to fit within said casing and having a first end and a second end, each of the filter units having:
i. a first planar surface wherein the first planar surface comprises a smooth inclined surface and a closed center portion and ii. a second planar surface having a filtering wall extending downwardly therefrom toward said open bottom end to an edge, wherein the second planar surface is designed for stacking alignment with the first planar surface of a second filter unit and wherein the edge forms a filter aperture with the first planar surface of the second filter unit,
c. at least one channel opening for receiving unfiltered wastewater effluent, said at least one channel opening defined adjacent said filtering wall;
d. at least one channel opening for receiving filtered wastewater effluent;
e. connecting elements to releasibly connect the stackable filter units together; and
f. at least one channel opening for receiving a handle unit;
wherein the plurality of stackable filter units are vertically oriented so that for each of the filter units the first planar surface is a top surface that is closer to said outlet than said second planar surface and the second planar surface is a bottom surface that is positioned below the top surface and closer to said open bottom end than said first planar surface.

13. The filter system of claim 12 wherein the first planar surface comprises a conical shaped with an inclined surface wherein the angle of inclination is less than ninety degrees.

14. The filter system of claim 12 wherein the angle of inclination of the first planar surface is between twenty and forty degrees.

15. The filter system of claim 12 wherein the filtering wall comprises a serpentine wall extending substantially outwardly from the second planar surface of the filter unit.

16. The filter system of claim 12 further comprising a plurality of channel openings for receiving unfiltered wastewater effluent.

17. The filter system of claim 12 further comprising a channel opening for receiving a filter unit alarm.

18. The filter system of claim 12 further comprising a sealing filter unit at the first end of the filter units, the sealing filter unit having a first planar surface and a second planar surface, wherein the second planar surface is designed for stacking alignment with the first planar surface of an adjacent filter unit and wherein the sealing filter unit comprising a seal for the filtered wastewater effluent channel opening.

19. The filter system of claim 12 further comprising a handle unit having
a. a generally horizontal hand grip at the first end of the filter units; and
b. at least one elongated rod extending from the hand grip to the second end of the filter units, the elongated rod having an end cap thereon at the second end, wherein the case comprises a matching hub for receiving the end cap in releasable locking engagement.

20. The filter system of claim 19 wherein the handle unit comprises two elongated rods, the elongated rods having end caps thereon at the second end, wherein the case comprises matching hubs for receiving the end caps in releasable locking engagement.

21. The filter system of claim 12 wherein the case is substantially cylindrical, wherein the case further decreases in diameter from a first end adjacent said outlet to the open bottom end, which is opposite the first end.

* * * * *